Dec. 18, 1962 E. C. B. CORLETT 3,068,602
SHIPS' HOISTS
Filed Oct. 8, 1959 2 Sheets-Sheet 1

Evan Christian Brar Corlett Inventor
By Dowell & Dowell
Attorneys

United States Patent Office 3,068,602
Patented Dec. 18, 1962

3,068,602
SHIPS' HOISTS
Ewan Christian Brew Corlett, Worting Park, near Basingstoke, England, assignor to Hydroconic Limited, London, England
Filed Oct. 9, 1959, Ser. No. 845,393
Claims priority, application Great Britain Oct. 10, 1958
8 Claims. (Cl. 43—8)

This invention relates to hoists for lifting objects aboard vessels, with particular reference to fishing vessels, harbour craft and buoy-lifting vessels.

According to the present invention, there is provided a ship's hoist comprising an upwardly-extending hoist arm or jib mounted to swing to and fro about a horizontal pivot axis at its lower end between an outboard position and an inboard position, which jib is in the form of a gantry having at least one upright or support leg with means supported at the upper end of the leg or legs for attachment of a load to be hoisted, the load-attachment means being arranged to carry such load at a position offset from the leg or each leg in the direction parallel to the pivot axis so that the gantry is not hindered from swinging toward a vertical position by the load encountering a leg or legs.

In the preferred form, the gantry has two spaced support legs and swings between an outboard position in which it is inclined in one direction to the vertical and an inboard position in which it is inclined to the vertical in the opposite direction, loads passing between the support legs as the gantry swings through the vertical.

One particular application of the invention is that of hoisting nets aboard a fishing trawler arranged for trawling over the stern. In this application the pivoted gantry is provided on the after deck of the vessel with means for moving the gantry from its outboard position in which a net being hauled is attached thereto to its inboard position in which the net can be discharged.

A gantry arrangement in accordance with the invention will now be described by way of example, and with reference to the accompanying drawings in which.

Figure 2:
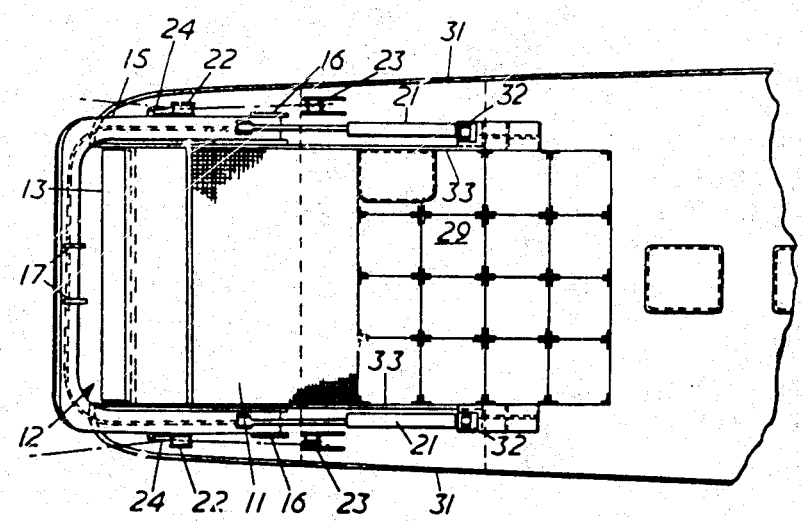
FIGURE 2 is a plan.

The drawings show a stern trawler in which the fishing platform 11 is the after deck of the vessel, and the stern 12 is made nearly rectangular in plan with a deck edge 13 well rounded in profile to allow the trawl to be hauled on board without being obstructed by sharp corners. Alternatively, a large roller may be provided at this point, if desired, as indicated in broken line at 14. The rounding of the deck edge is carried over the transom and down into the cut-up of the stern, thereby forming, as can be seen in FIGURE 2, a completely rounded surface over a portion of the stern adequate for hauling the trawl net.

Figure 1:
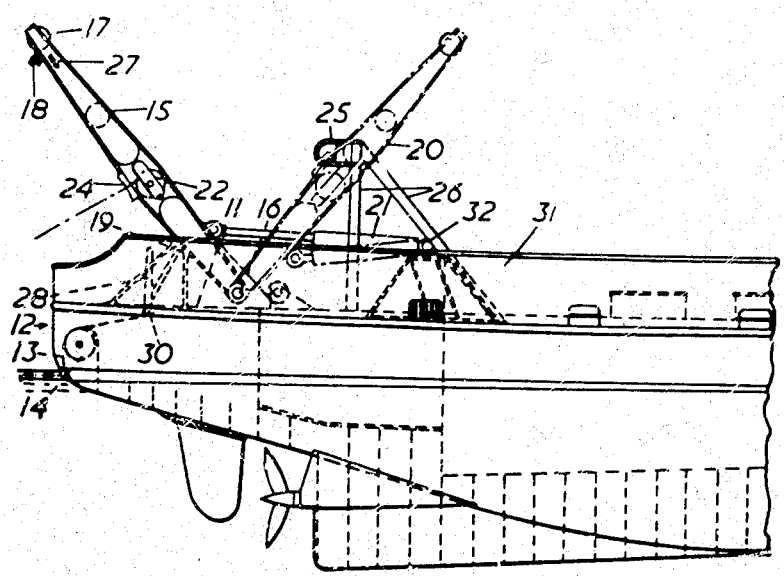
FIGURE 1 is an elevation of the stern of a fishing trawler.

A gantry 15, which may be constructed of steel or a light corrosion-resisting material such as aluminium alloy, and is of inverted U configuration, is pivoted, as indicated at 16, about the lower extremities of its support legs, at the port and starboard sides of the after deck, and carries near the centre of its transverse upper limb or crosstie one or more eyes 17 to which sheaves 18 are attached. This gantry can be swung in the fore-and-aft direction about its pivots 16 between the outboard position shown in full lines in FIGURE 1 and the inboard position shown at 20 in broken lines. The gantry is provided with a back stop or rest 19 such that in the outboard position the lifting sheave or sheaves 18 are vertically over a point a suitable distance aft of the stern of the vessel. The gantry can be actuated by any one of a number of different motive means, the preferred means shown being a pair of long stroke hydraulic rams 21.

When the vessel is trawling, the trawl warps are led over towing sheaves 22 attached to the outboard sides of the gantry structure port and starboard. From there they are taken to double deck sheaves 23 suitably placed forward of the pivot points 16 of the gantry, and thereafter to the trawl winch barrels (not shown). Chafing rollers 24 are fitted to the gantry adjacent the towing sheaves 22 to prevent damage to the gantry or wires.

When the trawl is being hauled the otterboards will first come to the towing sheaves 22. The gantry is then swung forward to the inboard position until the towing sheaves come adjacent fixed eyes 25 mounted on stanchions 26 port and starboard. The otterboards are secured to these eyes 25 by chains for temporary stowage, and the gantry is then swung aft again and hauling recommenced.

Figure 3:
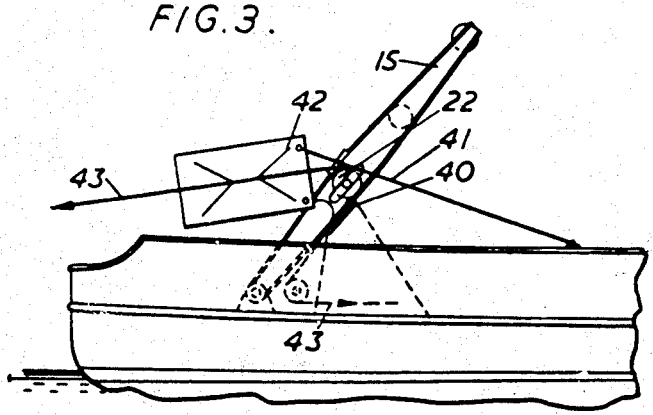
FIGURE 3 is a diagram illustrating a modification of the arrangement of FIGURES 1 and 2.

An alternative way of handling the otterboards is shown diagrammatically in FIGURE 3. In this case, the stanchions 26 and eyes 25 are not needed but the gantry is swung forward to the inboard position until it comes up against a forward stop or rest 40 like the back stop 19. A wire 41 is connected at one end to the otterboard 42 and at the other to the bulwark rail or the deck forward of the stop or rest 40. By letting out the trawl warp 43 from the drum of the trawl winch the otterboard is next lowered to the deck. The otterboard can then be freed from the warp and the gantry swung aft to recommence hauling.

After freeing of the otterboards, hauling is continued in the normal manner until the trawl is brought close to the stern and thence aboard over the rounded part 13 of the deck. When the cod end is at a point under the gantry sheave or sheaves 18 in the outboard position of the gantry, a line or lines are attached to the bag rope and are led over the gantry sheave or sheaves 18 and thence by further sheaves 27 in the sides of the gantry port and starboard to the second part of each double deck sheave 23 and to the warping ends of the trawl winch. Alternatively, the line, or each line, may be led directly from the gantry sheave to a deck sheave near the trawl winch and thence to the warping end of the winch. The net is then hauled close up to the head of the gantry.

Actuation of the rams 21 then swings the gantry to its inboard position again, thus lifting the net bodily over the stern and over a bulwark 28, the net passing between the gantry support legs until the cod end is over the working deck area or deck pounds 29. The cod end is now opened and the fish deposited.

The bulwark 28, which may be hinged and hydraulically operated, is arranged across the stern a suitable distance forward of and covering the transverse extent of the rounded portion 13. When hinged, as shown, the bulwark in the upright position forms a breakwater and the hinge is at a step 30 in the deck so that upon hinging down aft the bulwark forms a flush platform over which the trawl may be shot. Suitable stops and securing arrangements for the bulwark are provided.

In the embodiment illustrated, the ship's side bulwarks 31 run right aft, and turn inboard to be returned forward, as at 33, around the gantry feet, sheaves, etc., to the vicinity of the ram anchorages 32. This arrangement ensures a clear working deck and sides to avoid any obstruction to the net.

When making a passage, the otterboards can be stowed between the feet of the stanchions 26 and the outer bulwark 31. Spare otterboards may be stowed just forward of this position.

Modifications of the arrangement described are possible without departing from the scope of the invention. Thus, there can, if desired, be provision for sideways rotation of the gantry in addition to its swinging fore and aft, and it can also be arranged so as to stow flat on the deck when not in use.

Advantages of the arrangement described are that the handling of a loaded net is made much easier, and the speed and safety of the operation is much increased, as compared with conventional methods of hauling trawl nets.

Although the particular arrangement described deals only with the application of the invention to a stern trawler, it will be understood that the invention is not limited to this and indeed the same technique can be employed in other types of vessels for hoisting aboard objects other than fishing nets.

I claim:

1. A ship adapted for stern trawling comprising a hull structure, a deck thereon, bulwarks around the deck said bulwarks having an opening at the stern of the ship, a trawl net including a fish bag with a bag rope, an upwardly extending hoist jib having pivotal connection at its lower end to said hull structure at about deck level and at a position toward the stern but forward of said stern bulwark opening said pivotal connection having its pivot axis in a direction athwartships to enable said jib to swing to-and-fro between an inclined outboard position in which it projects out aft over the stern and an oppositely inclined inboard position, which jib is in the form of a gantry having two upstanding support legs spaced apart laterally to lie substantially at opposite sides of the hull structure with a cross member joining the upper ends of the legs, a backrest on which said jib is supported when in its inclined outboard position, power actuator means on said hull structure and operatively connected to said jib for swinging it between its outboard and inboard positions, towing sheaves on the legs of the jib, trawl net hauling warps passing over said towing sheaves, lifting sheave means on said jib cross member, and at least one line to pass over said lifting sheave means for connection to said trawl net bag rope, said jib legs being of a height to allow the fish bag, when hoisted to said cross member in the loaded condition with the jib in its outboard position, to pass through under said cross member and between said legs when the jib is swung from its outboard to its inboard position.

2. A ship adapted for stern trawling, comprising a hull structure, a deck thereon, bulwarks around the deck said bulwarks having an opening at the stern of the ship, a trawl net including a fish bag with a bag rope, an upwardly-extending hoist jib having pivotal connection at its lower end to said hull structure at about deck level and at a position toward the stern but forward of said stern bulwark opening said pivotal connection having its pivot axis in a direction athwartships to enable said jib to swing to-and-fro between an inclined outboard position in which it projects out aft over the stern and an oppositely inclined inboard position, which jib is in the form of a gantry having two upstanding support legs spaced apart laterally to lie substantially at opposite sides of the hull structure with a cross member joining the upper ends of the legs, a backrest on which said jib is supported when in its inclined outboard position, a forward-rest on which said jib is supported when in its inclined position, hydraulic power actuator means on said hull structure and operatively connected to said jib for swinging it between its outboard and inboard positions, deck sheaves mounted on said deck at positions near the lower ends of said jib legs, towing sheaves on the legs of the jib, trawl net hauling warps extending from the trawl net over said towing sheaves and thence down and around said deck sheaves, rollers mounted on said jib legs adjacent said towing sheaves to prevent said hauling warps chafing against said legs, lifting sheave means on said jib cross member, and at least one line to pass over said lifting sheave means for connection to said trawl net bag rope, said jib legs being of a height to allow the fish bag, when hoisted to said cross member in the loaded condition with the jib in its outboard position, to pass through under said cross member and between said legs when the jib is swung from its outboard to its inboard position.

3. A ship adapted for stern trawling, comprising a hull structure, a deck thereon, outer bulwarks around the deck, said bulwarks having an opening at the stern of the ship, a deck reception area for fish forward of said stern bulwark opening, inner bulwarks running fore-and-aft between said fish reception area and the stern bulwark opening, said inner bulwarks being at least as far toward the sides of the ship as to be spaced from one another by a distance as great as the width of said fish reception area but being inward of and spaced from said outer bulwarks, a trawl net including a fish bag with a bag rope, an upwardly-extending hoist jib having pivotal connection at its lower end to said hull structure at about deck level and at a position toward the stern between said stern bulwark opening and said fish reception area, said pivotal connection having its pivot axis in a direction athwartships to enable said jib to swing to-and-fro between an inclined outboard position in which it projects out aft over the stern and an oppositely inclined inboard position in which its upper end is over said fish reception area, which jib is in the form of a gantry having two upstanding laterally-spaced support legs with a cross member joining the upper ends of said legs and the lower ends of the legs being disposed in the spaces between the outer and inner bulwarks, a back-rest on which said jib is supported when in its inclined outboard position, power actuator means disposed in the spaces between the outer and inner bulwarks and operatively connected to said jib for swinging it between its outboard and inboard positions, towing sheaves on the legs of the jib, trawl net hauling warps passing over said towing sheaves, lifting sheave means on said jib cross member, and at least one line to pass over said lifting sheave means for connection to said trawl net bag rope, said jib legs being of a height to allow the fish bag, when hoisted to said cross member in the loaded condition with the jib in its outboard position, to pass through under said cross member and between said legs when the jib is swung from its outboard to its inboard position.

4. A ship according to claim 1, and comprising a horizontal roller athwartships disposed at the aft end of the deck.

5. A ship according to claim 4, wherein the deck slopes down aft to said horizontal roller.

6. A ship according to claim 1, wherein there is provided an after breakwater that can be hinged down flat to provide the opening in the stern bulwarks.

7. A ship according to claim 1, wherein there are provided fixed supports on the hull structure positioned so that in the inboard position of the gantry the towing sheaves on the jib legs come close to said fixed supports.

8. A ship comprising a hull structure, a deck thereon, bulwarks around the deck said bulwarks having an opening at the stern of the ship, an upwardly-extending hoist jib having pivotal connection at its lower end to said hull structure at about deck level and at a position toward the stern but forward of said stern bulwark opening, said pivotal connection having its pivot axis in a direction athwartships to enable said jib to swing to-and-fro between an inclined outboard position in which it projects out aft over the stern and an oppositely inclined inboard position, which jib is in the form of a gantry having two upstanding support legs spaced apart laterally by a distance greater than the width of the stern bulwark opening to lie substantially at opposite sides of the hull structure with a cross member joining the upper ends of the legs, a back-rest on which said jib is supported when in its inclined outboard position and which positively limits swinging of the jib aft, power actuator means on said hull structure and operatively connected to said jib for swinging it between its outboard and inboard positions, towing sheaves on the legs of the jib, said power actuator means being disposed at the side of the deck out of line with the stern bulwark opening, and lifting sheave means on said jib cross member, said jib legs being of a height to allow a load, when hoisted to said cross member with the jib in its outboard position, to pass through under said cross member and between said legs when the jib is swung from its outboard to its inboard position.

References Cited in the file of this patent

UNITED STATES PATENTS

| | | |
|---|---|---|
| 827,076 | Bolitho | July 31, 1906 |
| 1,152,038 | Morse | Aug. 31, 1915 |
| 2,187,439 | Woodeson et al. | Jan. 16, 1940 |
| 2,433,598 | Chadwick | Dec. 30, 1947 |
| 2,814,145 | Fredericks | Nov. 26, 1957 |
| 2,898,695 | Behring | Aug. 11, 1959 |